United States Patent
Ransijn

(12) 
(10) Patent No.: US 6,275,959 B1
(45) Date of Patent: Aug. 14, 2001

(54) ADAPTIVE THRESHOLD CONTROL CIRCUIT AND METHOD WITHIN HIGH SPEED RECEIVERS

(75) Inventor: Johannes Gerardus Ransijn, Wyomissing Hills, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/119,242

(22) Filed: Jul. 20, 1998

(51) Int. Cl.[7] .................................................... G06F 11/00
(52) U.S. Cl. ................................................................ 714/705
(58) Field of Search .................................. 714/705, 706, 714/704, 708, 709; 375/224

(56) References Cited

U.S. PATENT DOCUMENTS

| | | | |
|---|---|---|---|
| 4,097,697 | * | 6/1978 | Harman .............................. 179/175.3 |
| 5,295,155 | * | 3/1994 | Gersback et al. ......................... 375/4 |
| 5,798,852 | * | 8/1998 | Billes et al. ........................... 359/158 |
| 5,896,391 | * | 4/1999 | Solheim et al. ....................... 714/704 |

OTHER PUBLICATIONS

M. Sherif et al., "Decision–point steering in optical fibre communication systems : theory", IEE Proceedings, vol. 136, Pt.J., No.3, Jun. 1989.

* cited by examiner

*Primary Examiner*—Albert Decady
*Assistant Examiner*—Shelly A Chase

(57) ABSTRACT

Disclosed is a data regeneration circuit including a decision gate for regenerating a symbol stream (e.g., bit stream) by comparing the amplitude of individual symbols thereof to a decision threshold and outputting a logic level in accordance with each comparison. Threshold optimization circuitry dynamically measures first and second probability distribution points of each symbol, and based on the measurements, optimizes the decision threshold applied to the decision gate. A parallel pseudoerror path including a pseudoerror decision gate and pseudoerror counter may be employed to facilitate the measurements.

20 Claims, 7 Drawing Sheets

ADAPTIVE THRESHOLD CONTROL CIRCUIT AND METHOD WITHIN HIGH SPEED RECEIVERS

BACKGROUND OF THE INVENTION

The present invention pertains generally to data regeneration within high speed optical receivers and the like.

An optical receiver typically includes an optical detector for detecting an incoming optical signal (e.g., bit stream), a linear preamplifier and a decision circuit. The bit stream is comprised of logic zero and logic one data bits transmitted at different signal levels, i.e., "zero" and "one" levels. The decision circuit samples the detected bit stream and determines whether each bit is a one or a zero by comparing its detected signal level to a decision threshold in between the expected zero and one levels. A given sample is assumed to be a logic one if it exceeds the threshold, or logic zero otherwise. In receivers with dynamic adjustment capability, as the optical signal is received, the bit error ratio (BER) of the receiver is measured and the decision threshold is continually adjusted to minimize the BER.

When the amount of uncertainty, or noise, on both one and zero levels is equal, the optimum decision threshold is nominally halfway between the one and the zero level, i.e., in the center of the data "eye". This is usually the case for an AC coupled receiver receiving non-return-to-zero (NRZ) formatted data with a 50% ones density. For this system, the zero level is as far negative from the center of the eye as the one level is positive, and the eye center is at zero volts. A decision level adjustment for this case is generally not necessary.

The situation is different, however, when the noise is asymmetrical. For instance, in avalanche photo-detector (APD) receivers the noise on the ones can be somewhat higher than on the zeros. Nevertheless, a center position for the threshold is usually adequate. With the advent of wavelength division multiplexing (WDM) systems, however, the problem has become much more severe. The optical fiber amplifiers used in these systems exhibit so-called amplified spontaneous emission (ASE) noise, which is dominant on the ones level only. As a result, the optimum threshold is skewed towards the zero level and consequently, an adjustment must be made. To exacerbate the problem, the optical power received on any channel in a WDM link may vary, depending on the number of channels that are active. The reason for such variation is that in an optical amplifier, the total generated power (the sum of the powers of the individual channels) is constant. The optimum threshold will therefore vary as well. A one-time adjustment in this case is inadequate.

In an article by M. Sherif, P. A. Davis, entitled "Decision-point steering in optical fibre communication systems: theory", IEE Proceedings, Vol. 136, Pt.J., No.3, June 1989, analytical expressions are derived and several techniques are discussed for setting and controlling the decision threshold. These techniques are either based on coarse approximations, on extrapolation of measured pseudo bit error rates (PBER) or on analytical expressions. The first approach is inaccurate; the second and third approaches require implementation of search algorithms and numerical computation.

FIG. 1 illustrates a data regeneration circuit 10 that implements decision threshold adjustment using a pseudo-error measurement technique, as disclosed in the Sherif article. An input data signal is applied to both a main decision gate 12 and a pseudoerror decision gate 16. Clock extraction circuit 14 also receives the data signal and derives a clock therefrom to control the sampling instants of the two decision gates. Both decision gates 12, 16 output a solid logic level for each bit, based on a comparison between the bit's signal amplitude and a decision threshold applied to the respective gate. Hence, the output of gate 12 represents regenerated data. Microprocessor 15 generates a variable decision threshold $V_{TH}$ and a low frequency square wave of a predetermined amplitude. $V_{TH}$ is applied directly to decision gate 12 as the decision threshold. An adder 13 adds the square wave voltage to $V_{TH}$ to produce a modified decision threshold voltage which is applied to the pseudoerror decision gate 16. As a result, the bit error ratio of the data output from decision gate 16 is an order of magnitude greater than the BER of the data output by the main decision gate 12, i.e., PBER>BER.

A pseudo error counter 18 counts the pseudoerrors by comparing the outputs of the two gates 12, 16 and generating a count whenever the logic levels in the two paths differ. Microprocessor 15 searches for an optimum value for $V_{TH}$ by varying $V_{TH}$ and determining the PBER based on the count for each $V_{TH}$. When a minimum PBER is measured, $V_{TH}$ is assumed to be optimum for that square wave. The square wave amplitude is then changed and the process repeated. An extrapolation is then performed to compute the $V_{TH}$ value giving a minimum PBER for a zero amplitude square wave. That $V_{TH}$ value is assumed to be the optimum one, $V_{OPT}$. In an alternative method, an analytical expression, rather than an extrapolation, is used to predict the minimum bit error ratio and corresponding optimum threshold.

One drawback of the above methods is that, since a minimum in the bit error ratio must be found, a search algorithm must be used, which requires a microprocessor controlled monitoring system running a complex program. Furthermore, the methods are not very adaptive since a change in BER can mean two things: either the minimum BER or the optimum threshold has changed. For instance, assume that the optical power changes and the input level to the decision gate is compensated for by an AGC amplifier. In this case, both the ones' and zeros' noise change by about the same factor, thereby raising the minimum BER, but the optimum threshold stays the same. This condition might occur when one or more channels in a WDM system is added or drops out. An example of $V_{OPT}$ changing while the minimum BER does not occurs when the gain of the amplifier preceding the decision gate changes. The optimum threshold shifts to account for the change in ones and zeros levels, but the signal-to-noise ratio, and hence the minimum BER, have not changed. Hence, in the above cases, an ambiguity results when a change in BER is detected. Therefore, a continuous hunting of $V_{TH}$ for the minimum BER is needed. This ambiguity in $V_{OPT}$ tends to reduce the overall receiver sensitivity.

SUMMARY OF THE DISCLOSURE

The present disclosure relates to a data regeneration circuit including a decision gate for regenerating an input symbol stream (e.g., bit stream) by comparing the amplitude of individual symbols thereof to a decision threshold and outputting a logic level in accordance with each comparison. Threshold optimization circuitry dynamically measures first and second probability distribution points of each symbol, and based on the measurements, optimizes the decision threshold applied to the decision gate.

BRIEF DESCRIPTION OF THE DRAWINGS

The following detailed description, given by way of example and not intended to limit the present invention solely thereto, will best be appreciated in conjunction with the accompanying drawings, in which like reference numerals denote like parts or elements, wherein.

DETAILED DESCRIPTION OF CERTAIN PREFERRED EMBODIMENTS

Figure 1:
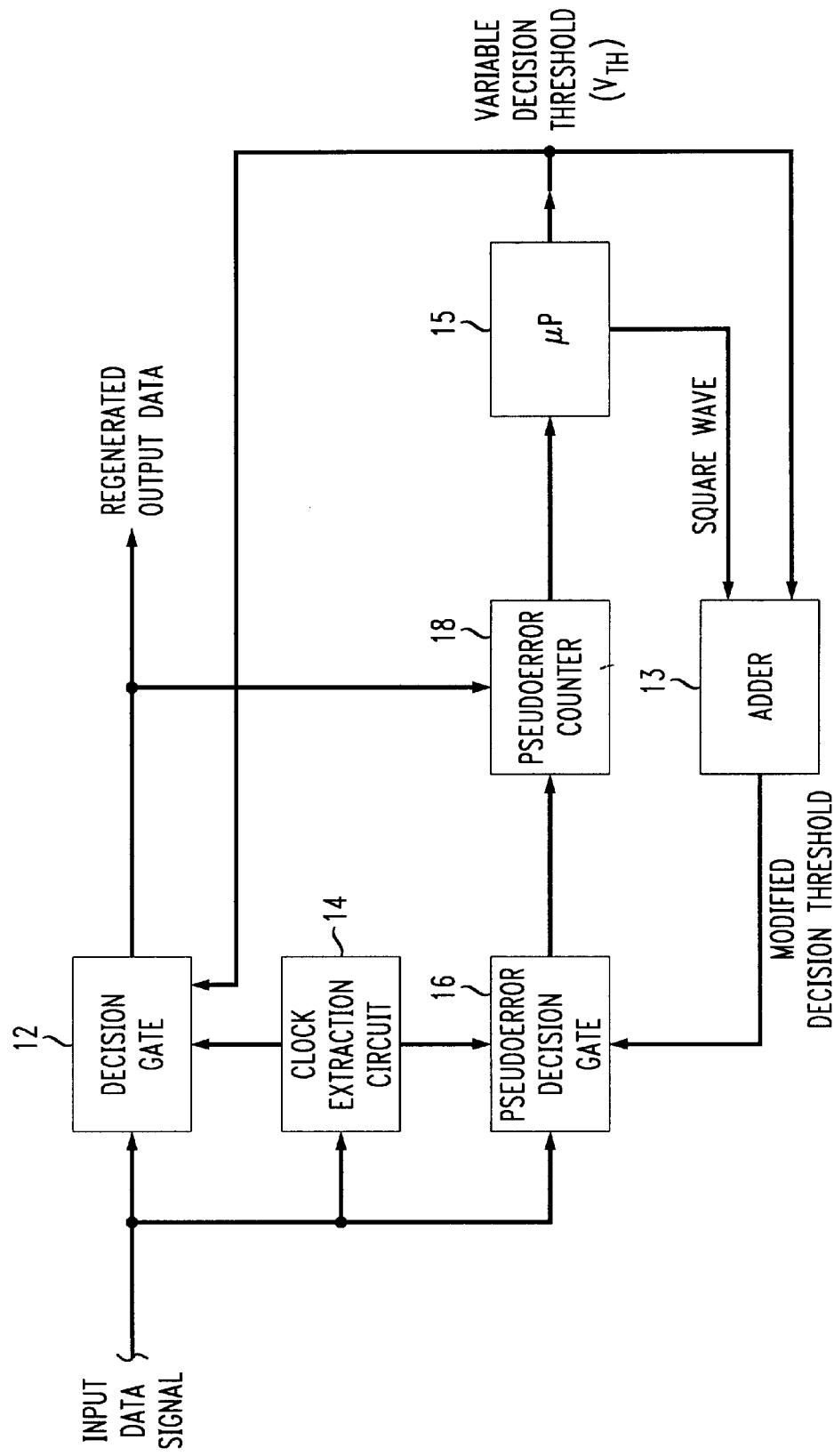
FIG. 1 is a block diagram of a prior art data regeneration circuit.
Figure 2:
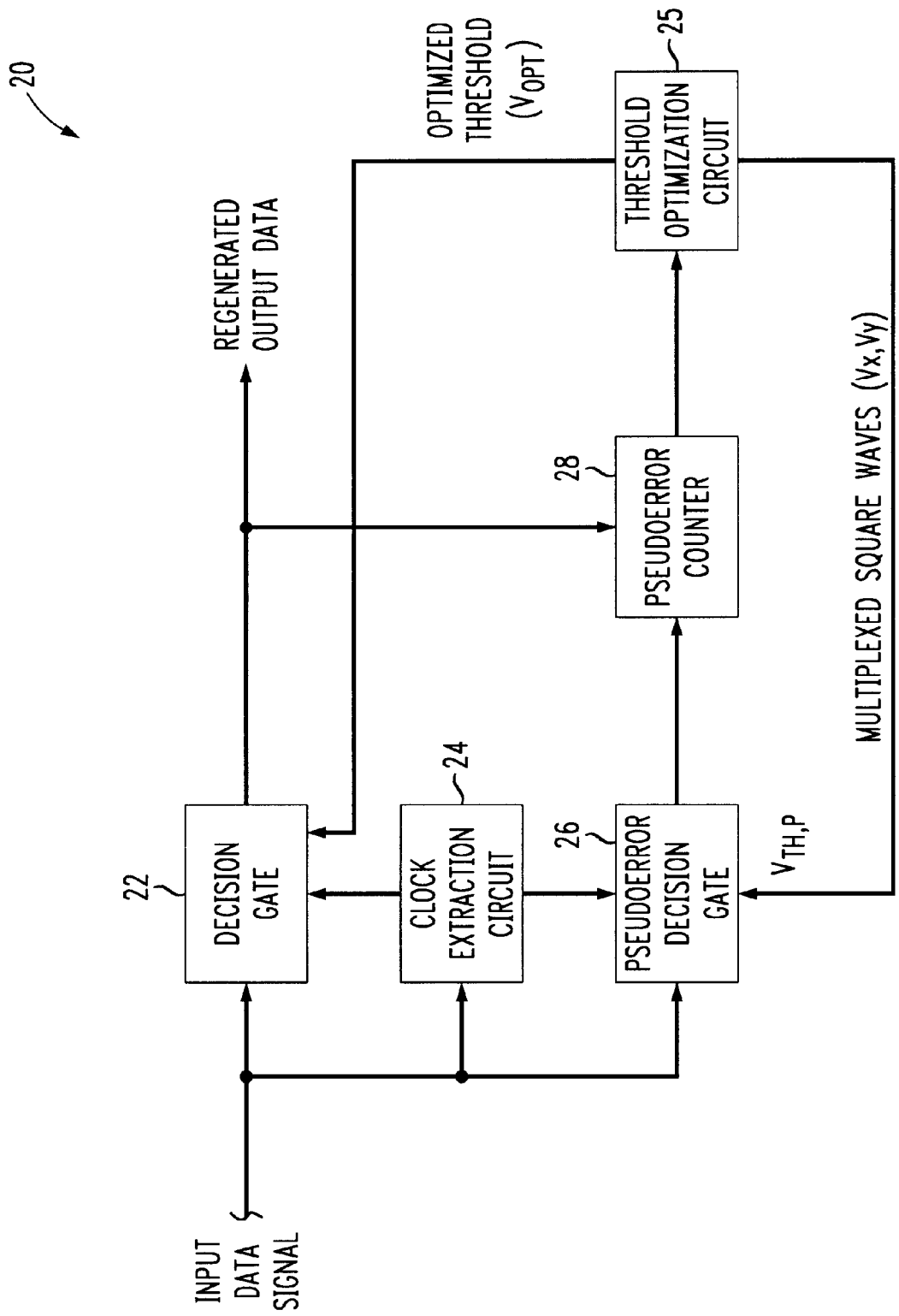
FIG. 2 is a block diagram of an embodiment of a data regeneration circuit in accordance with the invention.

Referring to FIG. 2, an embodiment of a data regeneration circuit, 20, in accordance with the invention is illustrated in block diagram form. As in the prior art circuit of FIG. 1, an input data signal (herein referred to interchangeably as a "symbol stream") is amplified and then applied to each of a main decision gate 22, clock extraction circuit 24 and pseudoerror decision gate 26. Pseudoerror counter 28 compares the logic level outputs of decision gates 22 and 26 and increments a count whenever a difference is detected, i.e., whenever one of the decision gate outputs is logic zero while the other is logic one.

In contrast to the previous methods, regeneration circuit 20 does not apply a sweeping decision threshold voltage superimposed with a square wave to the pseudoerror gate 26 and then search for a minimum PBER. Instead, a threshold optimization circuit 25 generates a decision threshold signal $V_{TH,P}$ comprised of two multiplexed square waves $V_X$, $V_Y$ for application to psuedoerror gate 26 for the purpose of measuring the mean and standard deviation voltages (first and second probability distribution points) of both the ones and zeros data. Based on these measured parameters, an optimized decision threshold $V_{OPT}$ is computed and applied to the main decision gate 22.

By avoiding a search of the minimum PBER, regeneration circuit 20 exhibits several advantages. First, the circuit affords improved receiver sensitivity for the following reason: in the prior art, the search for the threshold which produces the minimum BER is done in the null area of the BER vs. decision threshold curve, such that a large threshold change might be required to detect a small change in the BER. Hence, the receiver sensitivity is compromised. With the present approach, the measurement is performed on steep portions of the BER curve (as will become apparent later). Thus, small changes in the data symbol distributions, and hence small changes in the optimum decision threshold, are detected immediately, and adjustments to $V_{OPT}$ are made accordingly. As a result, receiver sensitivity is improved. In addition, threshold optimization circuit 25 can be realized either with operational amplifiers and analog multiplexers, or with processing circuitry running a relatively simple routine. There is no need to run a complex search algorithm which taxes a processor's resources. Simple operational amplifiers can be used to establish control loops, which can be optimized for speed. Moreover, the method is highly adaptive—high pseudoerror rates are preferably used, guaranteeing accurate error rate estimates that are rapidly updated.

Data regeneration circuit 20 typically forms part of an optical receiver, although high speed RF receiver applications are also contemplated. Prior to its application to regeneration circuit 20, the input data signal incident upon the receiver is detected by an avalanche photodetector or the like, then preamplified and filtered. The input data signal is typically a non-return-to-zero (NRZ) formatted signal; however, the invention is also applicable to the reception of RZ signals, in which case clock extraction circuit 24 is simplified. It is further noted that data regeneration circuit can be formed as (or forms a part of) a single integrated circuit chip.

Figure 3:
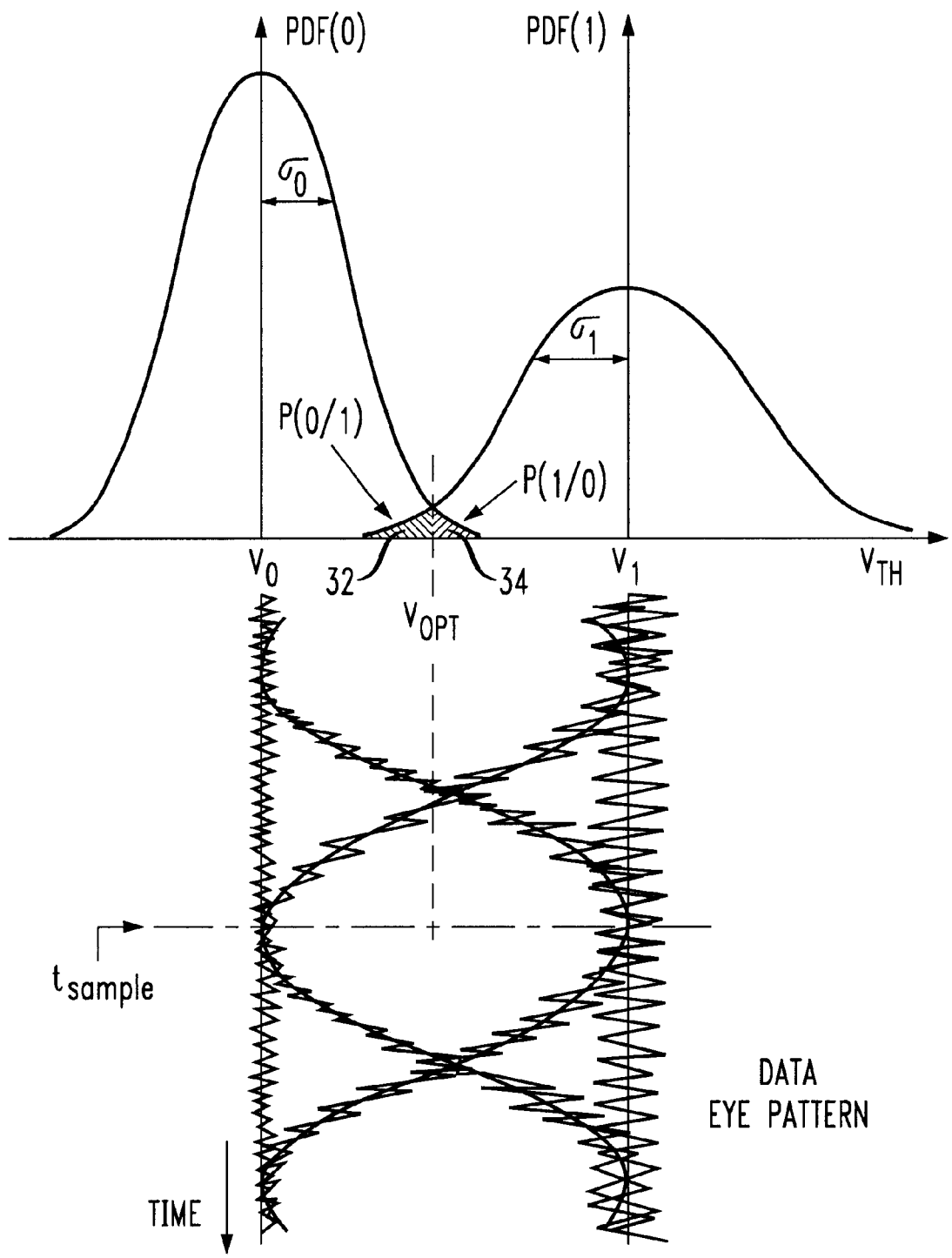
FIG. 3 illustrates a data eye pattern and associated probability density functions.

The method employed by regeneration circuit 20 to arrive at the optimized decision threshold $V_{OPT}$ will now be described in detail. First, to provide a foundation for the teachings of the present invention, mathematical relationships between the optimum threshold $V_{OPT}$ and the mean and standard deviation values of the data symbols will be derived. Referring to FIG. 3, a typical data eye pattern coming out of the preamplifier is shown. The time labeled "$t_{sample}$" denotes an illustrative sampling time (midway between the data transition points) at which the input data is sampled to regenerate the same. Above the eye diagram, the distributions, or probability density functions (PDFs) of the received symbols are plotted versus the decision threshold $V_{TH}$. In previous analyses of systems studied, these distributions have been considered Gaussian and can be characterized by a mean and a standard deviation. The voltage $V_0$ denotes the mean of the zeros and the voltage $V_1$ is the mean of the ones. Similarly, $\sigma_0$ and $\sigma_1$ are the standard deviations (rms noise voltages) of ones and zeros, respectively. From the figure it is seen that the higher noise level on the ones data results in a more spread out probability distribution function.

The total bit error ratio (BER) as a function of decision threshold is the sum of two bit error rates: P(0/1) is the probability that a zero is detected when a one was transmitted and P(1/0) is the probability that a one is detected when a zero was transmitted. In FIG. 3 these two quantities correspond to the area under the tail ends of the probability density curves as is shown for the case when the decision threshold $V_{TH}=V_{OPT}$. P(0/1) is the area 32 under the PDF(1) curve between $V_{OPT}$ and $V_0$. P(1/0) is the area 34 under the PDF(0) curve between $V_1$ and $V_{OPT}$. These probabilities are expressed mathematically as:

$$P(0/1) = \int_{-\infty}^{V_{OPT}} \frac{1}{\sigma_1 \sqrt{2\pi}} \exp\left[-\frac{(V_{TH} - V_1)^2}{2\sigma_1^2}\right] \quad (1)$$

$$P(1/0) = \int_{V_{OPT}}^{\infty} \frac{1}{\sigma_0 \sqrt{2\pi}} \exp\left[-\frac{(V_{TH} - V_0)^2}{2\sigma_0^2}\right] \quad (2)$$

The total error probability, assuming equal probability of ones' and zeros' transmission is:

$$P(e)=BER=0.5\{P(0/1)+P(1/0)\}. \quad (3)$$

The minimum BER occurs for the threshold voltage $V_{OPT}$ for which the PDF curves as defined by equations (1) and (2) are equal. $V_{OPT}$ can be thus be determined as follows:

$$\frac{1}{\sigma_1\sqrt{2\pi}}\exp\left[-\frac{(V_{TH}-V_1)^2}{2\sigma_1^2}\right] = \frac{1}{\sigma_0\sqrt{2\pi}}\exp\left[-\frac{(V_{OPT}-V_0)^2}{2\sigma_0^2}\right] \quad (4)$$

This equation can be transformed into a quadratic equation with the following general solution:

$$V_{OPT} = \frac{V_1+V_0}{2} + \frac{V_1-V_0}{2}\cdot\frac{\sigma_0-\sigma_1}{\sigma_0+\sigma_1}\left[1-\frac{2\sigma_0\sigma_1}{(\sigma_0-\sigma_1)^2}\left(1-\sqrt{1-2\frac{\sigma_0^2-\sigma_1^2}{(V_1-V_0)^2}\ln\frac{\sigma_1}{\sigma_0}}\right)\right] \quad (5)$$

The above result can be approximated by using $$\sqrt{1+x}\approx 1+\tfrac{1}{2}x \text{ for } x\ll 1 \quad (6)$$

and simplified by substituting the definition for the signal-to-noise ratio Q, namely:

$$Q \equiv \frac{V_1-V_0}{\sigma_0+\sigma_1} \quad (7)$$

which yields a more intuitive expression for $V_{OPT}$:

$$V_{OPT} \cong \frac{V_1+V_0}{2} + \frac{V_1-V_0}{2}\cdot\frac{\sigma_0-\sigma_1}{\sigma_0+\sigma_1}\left[1-\frac{2}{Q^2}\cdot\frac{\sigma_1/\sigma_0}{1-(\sigma_1/\sigma_0)^2}\ln\left(\frac{\sigma_1}{\sigma_0}\right)\right] \quad (8)$$

For practical values of Q (e.g., Q>6) the term between the brackets [ ] is sufficiently close to unity and the optimum threshold is:

$$V_{OPT} \cong \frac{V_1+V_0}{2} + \frac{V_1-V_0}{2}\cdot\frac{\sigma_0-\sigma_1}{\sigma_0\sigma_1} \quad (9)$$

It is noted that equation (9) and similar expressions are obtained in previous articles as well. In these works, however, the result is used to demonstrate that a certain method of predicting the minimum BER, and finding the optimum threshold, is valid, rather than to find $V_{OPT}$ directly.

Figure 4:
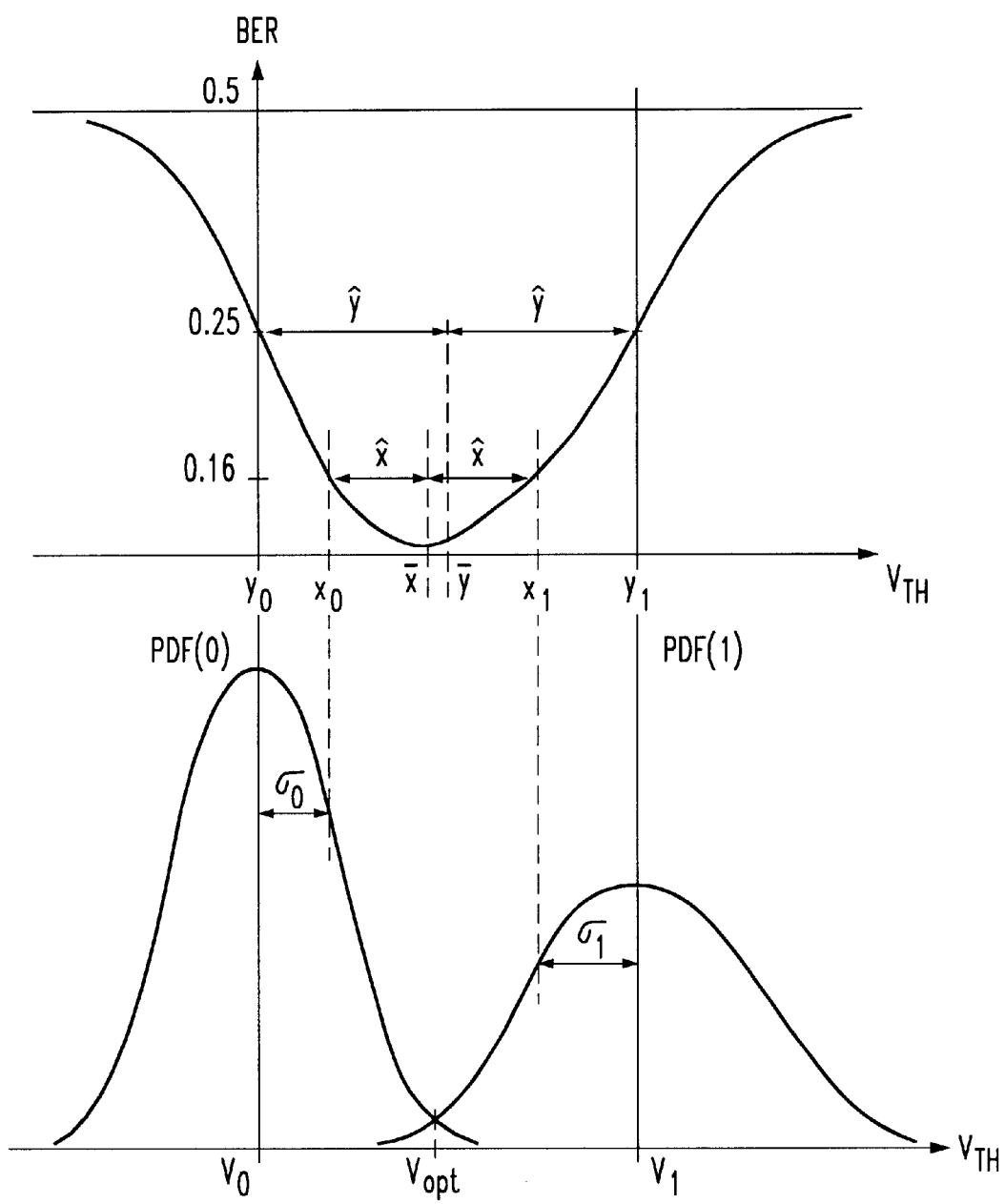
FIG. 4 is a graph illustrating bit error ratio as a function of decision threshold voltage, in relation to PDF curves for zero and one levels.

Turning now to FIG. 4, the bit error ratio given by equation (3) is plotted versus the decision threshold $V_{TH}$. The distributions PDF(0) and PDF(1) are also plotted in relation to the BER curve. In accordance with the present embodiment, pseudoerror rates are measured using pseudoerror counter 28 (FIG. 2) while threshold optimization circuit 25 alternately applies two low frequency square waves $V_X$ and $V_Y$ as the time varying decision threshold signal $V_{TH,P}$ to pseudoerror decision circuit 26. Each square wave has its own DC offset level (mean) and amplitude. $V_X$ has an offset $\bar{x}$ and amplitude $\hat{x}$; $V_Y$ has an offset $\bar{y}$ and amplitude $\hat{y}$. Consequently, $V_{TH,P}$ can take the four values $x_0=\bar{x}-\hat{x}$, $x_1=\bar{x}+\hat{x}$, $y_0=\bar{y}-\hat{y}$, $y_1=\bar{y}+\hat{y}$. The voltage levels for $\bar{x}$, $\hat{x}$, $\bar{y}$ and $\hat{y}$ are each allowed to vary and can be different from the threshold ($V_{OPT}$) applied to the main decision circuit 22.

Figure 5:
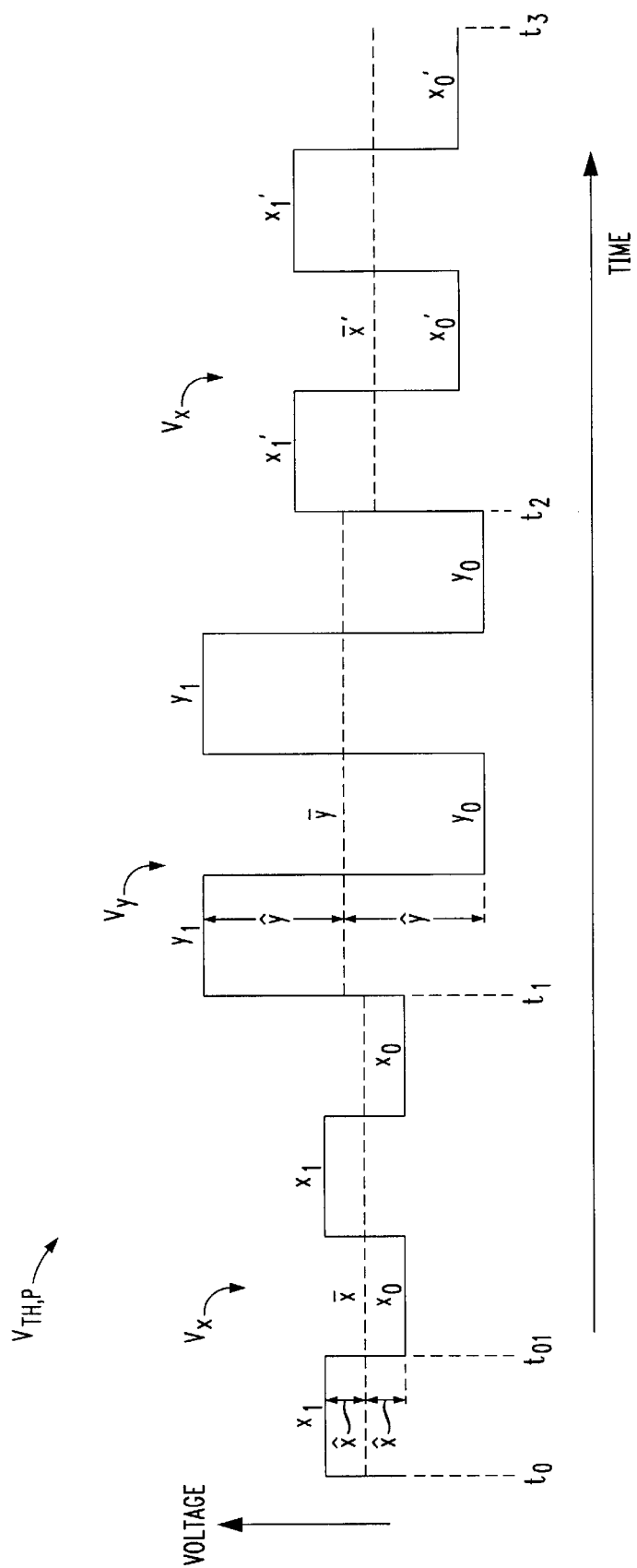
FIG. 5 illustrates a decision threshold signal comprised of multiplexed square waves.

FIG. 5 illustrates the variable threshold signal $V_{TH,P}$ as a function of time, with $V_X$ applied between times $t_0$–$t_1$ and $t_2$–$t_3$ and $V_Y$ applied between times $t_1$–$t_2$ as an example. The four distinct pseudoerror rates $P(x_0)$, $P(x_1)$, $P(y_0)$, $P(y_1)$ emanating from the four thresholds $x_0$, $x_1$, $y_0$ and $y_1$, respectively, are sampled at instances corresponding to the application of the respective thresholds. As will become apparent below, the number of cycles of each square wave may differ, depending on the technique used to vary the square wave amplitude and offset levels to arrive at the optimized decision level. In the example shown, the levels labeled as $x_0'$, $x_1'$, etc. of the $V_X$ square wave have changed relative to previous values between times $t_0$ and $t_1$ to demonstrate the square wave variation technique of the present embodiment.

The objective of this embodiment is to measure the variables $V_0$, $V_1$, $\sigma_0$ and $\sigma_1$, so that $V_{OPT}$ as defined in equation (9) can be determined. $V_0$ and $V_1$ are measured by controlling $V_Y$ to satisfy the following conditions:

$$P(y_0)-P(y_1)=0; \text{ and} \quad (10)$$

$$P(y_0)+P(y_1)=0.5 \quad (11)$$

By controlling the mean value $\bar{y}$ of $V_Y$, eqn. (10) is satisfied. Controlling the amplitude $\hat{y}$ of $V_Y$ satisfies eqn. (11). Thus, $$y_0=V_0, \text{ and} \quad (12)$$

$$y_1=V_1. \quad (13)$$

Similarly, $\bar{x}$ and $\hat{x}$ can be forced to values wherein $x_0$ and $x_1$ coincide with the thresholds that are one standard deviation away from the zero and one rails ($V_0$ and $V_1$), respectively. When:

$$P(x_0)-P(x_1)=0 \text{ and} \quad (14)$$

$$P(x_0)+P(x_1)=0.32[P(y_0)+P(y_1)] \quad (15)$$

then:

$$x_0=V_0+\sigma_0 \text{ and} \quad (16)$$

$$x_1=V_1-\sigma_1. \quad (17)$$

By substituting expressions (12), (13), (16) and (17) into eqn. (9), $V_{OPT}$ is determined as:

$$V_{OPT} \cong \frac{y_1+y_0}{2} - \frac{y_1-y_0}{2}\cdot\frac{(y_1+y_0)-(x_1+x_0)}{(y_1-y_0)-(x_1-x_0)} \quad (18)$$

which is simplified to:

$$V_{OPT}\cong\bar{y}-\hat{y}(\bar{y}-\bar{x})/(\bar{y}-\hat{x}). \quad (19)$$

Thus, in accordance with the present embodiment, the mean and standard deviation voltages are measured for both symbol distributions, e.g., zeros' and ones' distributions. (Herein, the term "standard deviation voltage" is used to refer to the voltage corresponding to $x_0$, i.e., the mean plus standard deviation of the zeros' distribution; or to $x_1$, i.e., the mean minus standard deviation of the ones' distribution.) Based on these measured parameters, $V_{OPT}$ is computed and applied to the main decision gate. The mean and standard deviation voltages are constantly re-measured to be consistent with any changes in the data signal, and $V_{OPT}$ is updated accordingly.

Figure 6:
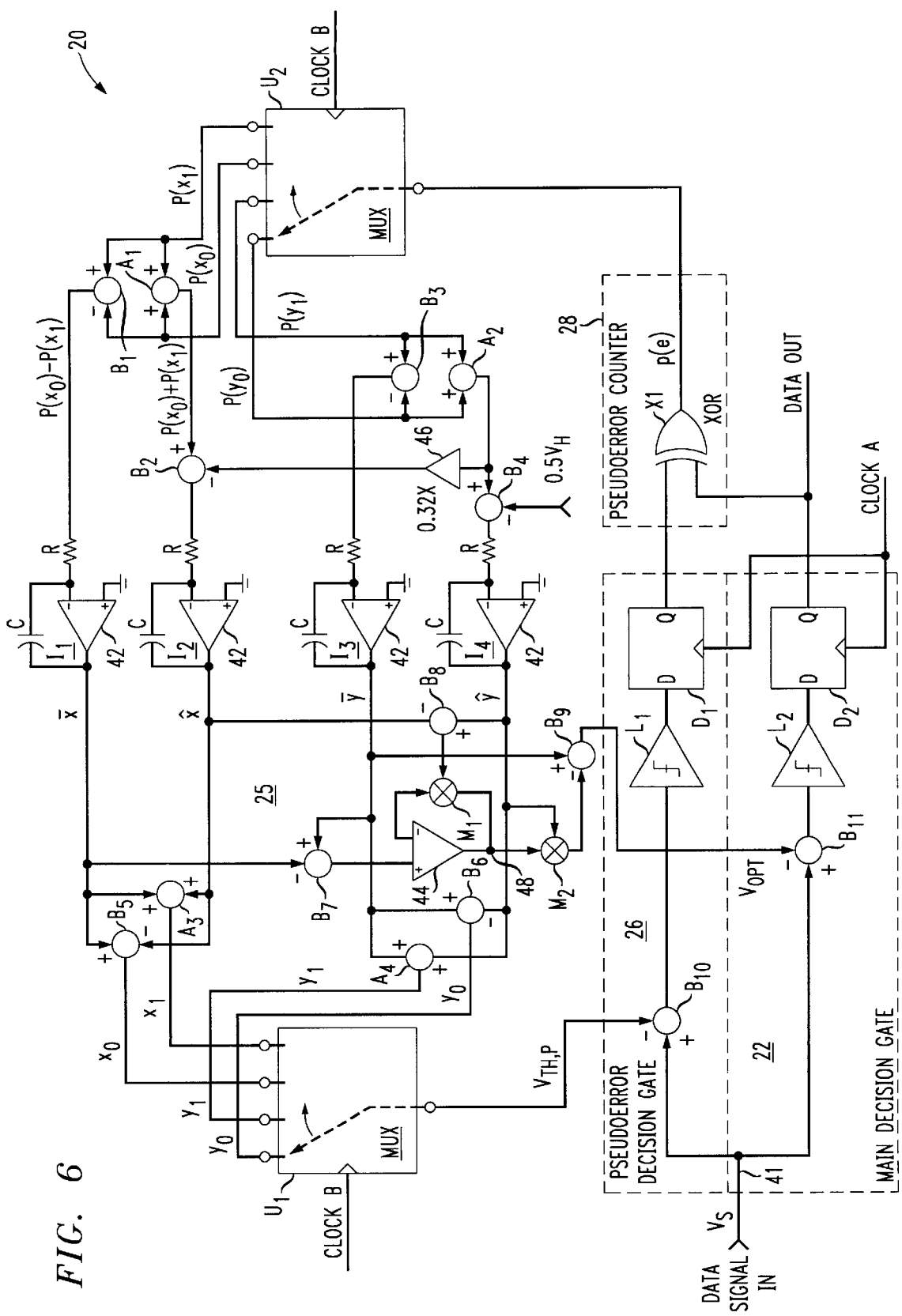
FIG. 6 is a circuit diagram of an analog type threshold optimization circuit in accordance with the invention.

Referring now to FIG. 6, an illustrative circuit arrangement for threshold optimization circuit 25 is shown. Exemplary circuits for main decision gate 22, pseudoerror decision gate 26 and pseudoerror counter 28 are also depicted. Briefly, optimization circuit 25 employs an op-amp 44 and a pair of analog multipliers $M_1$, $M_2$ to solve eqn. (19) and generate the optimized decision threshold $V_{OPT}$. The four thresholds $x_0$, $x_1$, $y_1$ and $y_2$ are realized by means of a four way analog multiplexer $U_1$ which is synchronous with a second multiplexer $U_2$ connected to pseudoerror counter 28. Adders $A_1$–$A_4$ and subtracters $B_1$–$B_9$ can be implemented with op-amps.

In operation, an input data signal $V_S$ on line 41 is applied to both decision gates 22 and 26. Data signal $V_S$ is typically a high data rate bit stream in the Gbit/sec range. Decision gate 22 regenerates the input data signal by first subtracting the voltage $V_{OPT}$ from the data signal using analog subtracter $B_{11}$. Amplifier/limiter $L_1$ amplifies and limits the difference so as to provide a solid logic one voltage (logic one rail) when $V_S > V_{OPT}$, and a solid logic zero (zero rail) when $V_{OPT} > V_S$. D flip-flop D, transfers the logic sample to its output with each clock A pulse, whereby the data signal is regenerated to a bit stream containing solid logic one and zero levels. The clock A pulse is usually provided by clock extraction circuit 24, which synchronizes a local clock signal to the bit timing of the data signal.

In a similar manner, pseudoerror decision gate 26 subtracts the threshold $V_{THP}$ from the data signal $V_S$ using subtracter $B_{10}$, then amplifies and limits the difference to the logic level rails using amplifier/limiter $L_2$. With every clock A pulse, the samples are transferred to the Q output of flip-flop $D_2$ and to the other input of XOR gate X1. The output P(e) of X1 is a logic high ($V_H$) whenever the logic outputs of the two decision gates 22, 26 differ. P(e) is applied to MUX $U_2$ where it is switched among four outputs at the relatively slow rate of clock B, e.g., in the KHZ to MHZ range. MUX $U_2$ is synchronized to MUX $U_1$ which switches between one of four lines carrying thresholds $y_0$, $y_1$, $x_0$ and $x_1$, respectively. Consequently, the voltages on the four output terminals of MUX $U_2$ represent the pseudoerror bit rates $P(y_0)$, $P(y_1)$, $P(x_0)$ and $P(x_1)$, respectively. Since clock A is much faster than clock B, with appropriate filtering (within MUX $U_1$, for example), the output P(e) is converted to a DC voltage representing the pseudoerror bit rate associated with the current threshold. Adder $A_1$ adds $P(x_0)$ and $P(x_1)$; subtracter $B_1$ subtracts $P(x_1)$ from $P(x_0)$; adder $A_2$ adds $P(y_0)$ and $P(y_1)$; and subtracter $B_2$ subtracts $P(y_0)$ from $P(y_1)$. Amplifier 46 scales the output of adder $A_1$ by a factor of 0.32 to produce an output voltage corresponding to the right-hand side of eqn. (14). Subtracter $B_3$ thus compares the left side of eqn. (14), $P(x_0)+P(x_1)$, to the right side. Similarly, subtracter $B_4$, which receives a reference voltage at one input and $P(y_0)+P(y_1)$ on its other input, compares signals corresponding to the two sides of eqn. (11). The reference voltage applied to subtracter $B_4$ should be $0.5V_H$ as indicated if MUX $U_2$ is designed with integrate-and-dump style outputs. On the other hand, if a simple analog switch is used for MUX $U_2$, there is really only an average of $[P(y_1)+P(y_2)]/4$ coming out of adder $A_2$. In this case, the reference voltage applied to subtracter $B_4$ should be $V_H*0.5/4=0.125V_H$ rather than $0.5V_H$.

Integrators $I_1-I_4$ each include an input resistor R, op-amp 42 and feedback capacitor C. The outputs of subtracters $B_1-B_4$ are fed to the inverting op-amp inputs of integrators $I_1-I_4$, respectively. Due to the closed loop feedback arrangement and the operation of the various adders and subtracters, the outputs of integrators $I_1-I_4$ converge to values corresponding to $\bar{x}$, $\hat{x}$, $\bar{y}$ and $\hat{y}$, respectively. The outputs of $I_1$ and $I_2$ are summed by adder $A_3$ to generate $x_1$. Subtracter $B_5$ produces $x_0=\bar{x}-\hat{x}$. Likewise, adder $A_4$ generates $y_1$ and subtracter $B_6$ generates $y_0$. In the steady state, the four thresholds $y_0$, $y_1$, $x_0$ and $x_1$ converge to the respective mean and standard deviation voltages of the zeros and ones distributions discussed earlier. The feedback arrangement allows the four thresholds to be quickly updated with any changes in the actual mean and standard deviation values of the data signal.

The optimized threshold $V_{OPT}$ is generated in accordance with eqn. (19) by means of subtracters $B_7-B_9$, op-amp 44 and multipliers $M_1$, $M_2$. Subtracter $B_7$ produces $(\bar{x}-\bar{y})$, which is applied to the non-inverting input of op-amp 44. Subtracter $B_8$ produces $(\hat{y}-\hat{x})$, which is applied to one input of multiplier $M_1$. The other input of $M_1$ is tied to the inverting input of op-amp 44. The outputs of $M_1$ and op-amp 44 are tied together at node 48. The feedback loop produces the quotient $(\bar{x}-\bar{y})/(\hat{y}-\hat{y})$ at node 48. Multiplier $M_2$ multiplies the voltage at node 48 with $\hat{y}$. The output of $M_2$ is subtracted from $\bar{y}$ by subtracter $B_9$ to generate $V_{OPT}$ in accordance with eqn. (19). $V_{OPT}$ is applied as the decision threshold to subtracter $B_{11}$ of the main decision circuit as discussed earlier. As the zeros and ones distributions change, the closed loop arrangement enables $V_{OPT}$ to be rapidly updated.

In an alternative embodiment, threshold optimization circuit 25 is embodied as a processor running a relatively simple routine to find first and second probability distribution points (e.g., mean and standard deviation voltages) of both the zeros and ones distributions to compute $V_{OPT}$. The processing circuitry employed may be dedicated solely to the task of optimizing the decision threshold, or may be part of a processor running other tasks simultaneously such as avalanche photodiode gain optimization.

Figure 7:
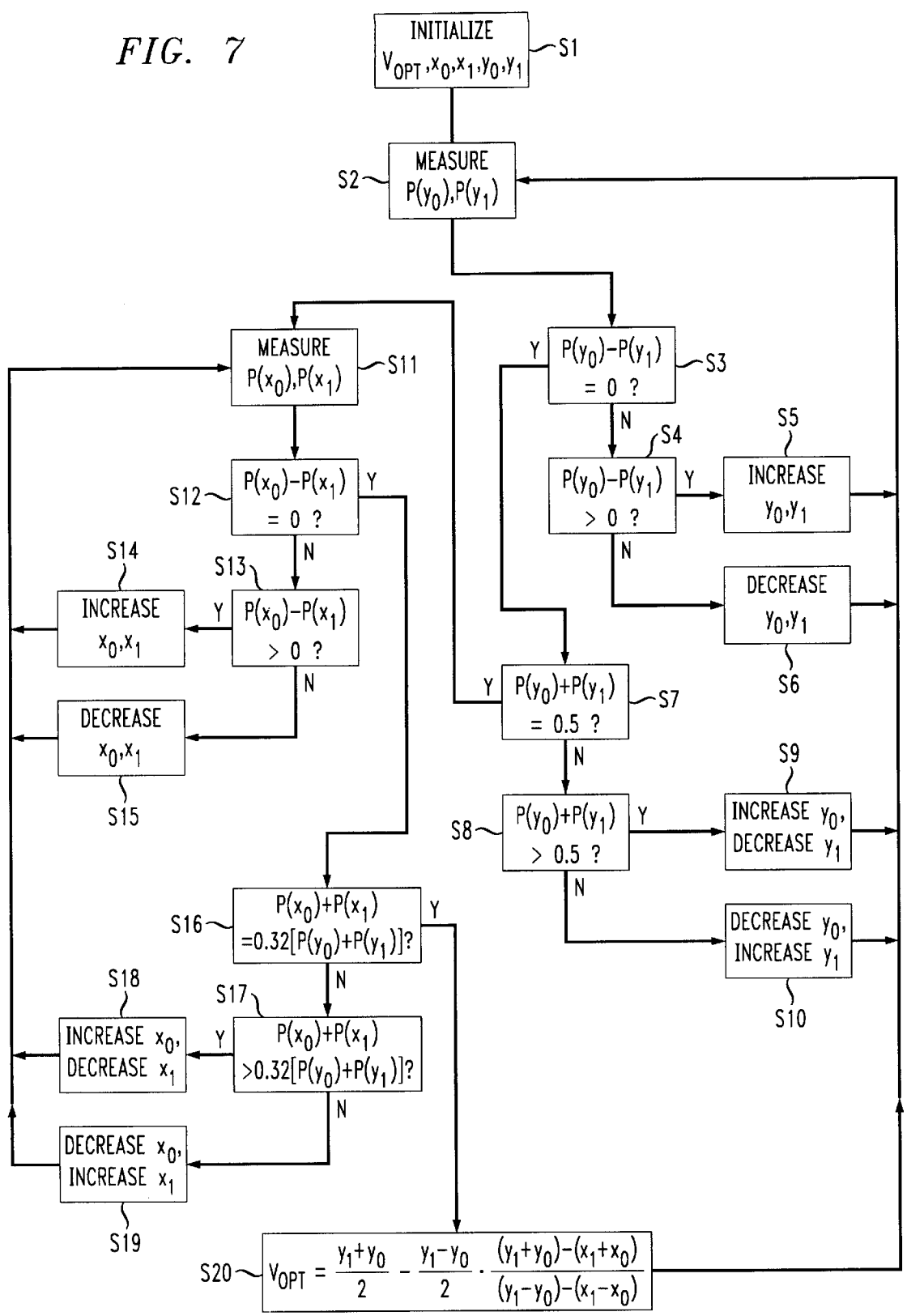
FIG. 7 is a flow chart illustrating a routine running within a processor for computing an optimized decision threshold.

Referring to FIG. 7, a flow diagram of an exemplary routine running within such processor 25 is shown. At the start (step S1), thresholds $V_{OPT}$, $x_0$, $x_1$, $y_0$ and $y_1$ are set to pre-stored initial values. These initial values are estimates based on the receiver's optical detector, the data rate, previous measurements, etc. $V_{OPT}$ is supplied to decision gate 22 while the other thresholds are alternately provided to pseudoerror decision gate 26. The first part of the routine (steps S2 to S10) is designed to determine a precise mean for both the zeroes and ones data, i.e., $y_0(=V_0)$ and $Y_1(=V_1)$, respectively, based on eqns. (10) and (11). The second part of the routine, steps S11 to S19, ascertains the standard deviation voltages $x_0=y_0+\sigma_0$ and $x_1=y_1-\sigma_1$ of the zeros' and ones' data, respectively, based on eqns. (14) and (15). Eqn. (18) is then solved in step S20 to arrive at $V_{OPT}$.

To determine the mean values $y_0$ and $y_1$, the measured pseudoerror counts $P(y_0)$, $P(y_1)$ of counter 28 are provided to the processor (step S2). The measured counts are those within a prescribed time interval, for example, within one $V_Y$ square wave period as shown in FIG. 5. If, in step S3, $P(y_0)-P(y_1)=0$ (to within a predetermined tolerance), eqn. (10) is satisfied and the flow proceeds to S7. If the result in S3 exceeds zero, $y_0$ and $y_1$ are both increased by the same amount in step S4. (Alternatively, just $y_0$ or $y_1$ can be increased in this step). Otherwise, $y_0$ and/or $y_1$ are decreased in S6. The new decision thresholds $y_0$, $y_1$ are then applied to the pseudoerror decision gate. The error counts $P(y_0)$ and $P(y_1)$ are measured again in S3 and the process is repeated until $P(y_0)$ and $P(y_1)$ are equalized. The zeros' and ones' means are then found by performing steps S7 to S10 and remeasuring $P(y_0)$, $P(y_1)$ until eqn. (11) computed in step S7 is satisfied. Note that in step S9, the amount that $y_0$ is increased is the same as the amount that $y_1$ is decreased, and vice versa in step S10.

Next, the initial values for $x_0$ and $x_1$ are applied as the square wave $V_X$ to pseudoerror decision gate 26 and the error counts corresponding to these thresholds are measured in step S11. $X_0$ and $x_1$ are adjusted in steps S11-S15 until the error counts are equalized in accordance with eqn. (14). That is, steps S12 to S15, which are performed to equalize $P(x_0)$ and $P(x_1)$, are analogous to steps S3 to S6 to equalize $P(y_0)$ and $P(y_1)$.

In steps S16 to S19, the standard deviation voltages $x_0=y_0+\sigma_0$, $x_1=y_1-\sigma_1$ are arrived at by adjusting $x_0$ and $x_1$ until eqn. (15) of step 16 is satisfied. Thus, if the two sides of eqn. (15) are unequal, $x_0$ is increased and $x_1$ decreased in step S18 by the same amount, or vice versa in step S19, depending on the outcome of S17. $P(x_0)$ and $P(x_1)$ are measured again in step S11, whereupon the flow continues from S12 to S17 since the changes in $x_0$ and $x_1$ were opposite but equal. When the equation of S16 is solved within a predetermined tolerance, the routine proceeds to step S20 where the optimized threshold $V_{OPT}$ is computed and output to the main decision gate. The process is continually repeated to adjust for any changes that may occur in the probability distributions of the data signal.

In the above-described embodiments of the present invention, the mean and the standard deviation voltages of each data symbol distribution are measured to arrive at the optimized decision threshold $V_{OPT}$. In the alternative, a measurement of different probability distribution points could be made to determine $V_{OPT}$. Any two threshold pairs $(x_0', x_1')$, $(Y_0', y_1')$ could be used to produce two distinct PBER rates that are much larger than the BER. As long as these two pairs are made from linear combinations of ones' and zeros' means and sigmas, $V_{OPT}$ as determined from eqn. (9) can be derived from these new probability distribution points as follows:

$$x_0'=y_0+\alpha\sigma_0 \; x_1'=y_1-\alpha\sigma_1; \; y_0'=Y_0+\beta\sigma_0 \; y_1'=Y_1-\beta\sigma_1, \quad (20)$$

where $\alpha$ and $\beta$ are constants. Then, $$V_0=y_0=(\alpha y_0'-\beta x_0')/(\alpha-\beta) \; \sigma_0=|(y_0'-X_0')/(\alpha-\beta)|; \quad (21)$$

$$V_1=y_1=(\alpha y_1'-\beta x_1')/(\alpha-\beta) \; \sigma_1=|(y_1'-x_1')/(\alpha-\beta)|. \quad (22)$$

Equation (9) is then solved based on $V_0$, $V_1$, $\sigma_0$ and $\sigma_1$ to arrive at $V_{OPT}$. It is noted that the original case corresponds to $\alpha=1$, $\beta=0$. If one were to select $\alpha\approx1$, the algorithm and implementation stays basically the same, except for the 0.32 factor in eqn. (15).

While the present invention has been described above with reference to specific embodiments thereof, it is understood that one skilled in the art may make many modifications to the disclosed embodiments without departing from the spirit and scope of the invention. For instance, although the disclosed embodiments employ a pseudoerror path in parallel with the main data path for the purpose of measuring the zeros' and ones' mean and standard deviation, it is contemplated that other methods may be used to provide such measurements. One alternative method, albeit complex, is to sample the analog level of each bit, convert the same to a digital code and perform statistical analysis using a processor, continually updating the mean and standard deviation values. This method is feasible for low speed systems.

Further, while the embodiments have been described in the context of a binary data stream, it is applicable to non-binary data communication as well. For the case of non-binary data, e.g., tertiary or quaternary data, multiple decision thresholds are determined in accordance with the same technique of finding the mean and standard deviation voltages (or other probability distribution points) of the respective data symbols and computing optimum thresholds based thereupon. Accordingly, these and other modifications are intended to be included within the scope of the invention as defined by the appended claims.

What is claimed is:

1. A data regeneration circuit comprising:
   a main decision gate for regenerating an input symbol stream by comparing the amplitude of individual symbols thereof to a decision threshold and outputting a logic level in accordance with each comparison; and
   threshold optimization circuitry operable to dynamically measure first and second probability distribution points of each symbol, and based thereupon, to optimize said decision threshold applied to said decision gate.

2. The data regeneration circuit of claim 1 wherein said symbol stream is a bit stream.

3. The data regeneration circuit of claim 1 wherein said first probability distribution point of each symbol is the mean voltage of the symbol, the second probability distribution point of a first symbol of the symbol stream is the mean plus standard deviation voltage of the first symbol, and the second probability distribution point of a second symbol of the symbol stream is the mean minus standard deviation voltage of the second symbol.

4. The data regeneration circuit of claim 1 wherein said threshold optimization circuitry optimizes said decision threshold in accordance with the following equation:

$$V_{OPT} = \frac{y_1+y_0}{2} - \frac{y_1-y_0}{2} \cdot \frac{(y_1+y_0)-(x_1+x_0)}{(y_1-y_0)-(x_1-x_0)}$$

where $V_{OPT}$ is the optimized decision threshold, $y_0$ is the mean voltage of a first symbol of the symbol stream, $y_1$ is the mean voltage of a second symbol of the symbol stream, $X_0$ is the mean plus standard deviation voltage of the first symbol and $x_1$ is the mean minus standard deviation voltage of the second symbol.

5. The data regeneration circuit of claim 4 wherein said first symbol is a binary logic zero and said second symbol is a binary logic one.

6. The data regeneration circuit of claim 1, further comprising:
   a pseudoerror decision gate for comparing symbols of the symbol stream with a time varying decision threshold signal having a plurality of threshold levels and for outputting a logic level in accordance with each comparison;
   a pseudoerror counter for comparing the outputs of the main and pseudoerror decision gates and based thereupon, providing an output signal corresponding to a pseudo bit error rate (PBER) for each threshold level of the decision threshold signal; and
   said threshold optimization circuitry being further operable to generate said decision threshold signal, compare PBERs associated with the respective threshold levels and vary each threshold level so as to satisfy predetermined relationships between the PBERs of the respective threshold levels, and determine the optimized threshold based on threshold level values that satisfy the predetermined relationships.

7. The data regeneration circuit of claim 6 wherein:
   said plurality of levels are formed by first and second time multiplexed square waves, said first square wave defining first and second threshold levels, said second square wave defining third and fourth threshold levels;
   said first square wave being varied in amplitude and offset level until the PBERs associated with the first and second levels are substantially equal and the sum thereof substantially equals 0.5, whereby the first and second levels correspond to the means of the first and second symbols, respectively;
   said second square wave being varied in amplitude and offset until the PBERs associated with the third and fourth levels are substantially equal and the sum thereof substantially equals 0.32 times the sum of the PBERs of the first and second levels, whereby the third and fourth levels correspond to standard deviation voltages of the first and second symbols, respectively.

8. The data regeneration circuit of claim 6 wherein said threshold optimization circuitry comprises a processor running a routine to vary said threshold levels, compare said PBERs and compute said optimized decision threshold based on the threshold level values that satisfy the predetermined relationships.

9. The data regeneration circuit of claim 6 wherein said threshold optimization circuitry comprises:

first and second multiplexers clocked synchronously, said first multiplexer alternately providing different threshold levels to said pseudoerror decision gate and said second multiplexer receiving said output signal of said pseudoerror counter and alternately switching it to a plurality of output terminals thereof so as to provide pseudo bit error rates at the respective output ports thereof corresponding to said different threshold levels; and a plurality of analog adders, subtracters and integrators for generating said threshold levels, based on the pseudo bit error rates, in accordance with said predetermined relationships; and, analog computational circuitry for computing said optimized threshold based on the threshold levels.

10. An integrated circuit comprising:

a data regeneration circuit including:

a main decision gate for regenerating an input symbol stream by comparing the amplitude of individual symbols thereof to a decision threshold and outputting a logic level in accordance with each comparison; and threshold optimization circuitry operable to dynamically measure first and second probability distribution points of each symbol, and based thereupon, to optimize said decision threshold applied to said decision gate.

11. The integrated circuit of claim 10 wherein said first probability distribution point of each symbol is the mean voltage of the symbol, the second probability distribution point of a first symbol of the symbol stream is the mean plus standard deviation voltage of the first symbol, and the second probability distribution point of the second symbol of the symbol stream is the mean minus standard deviation voltage of the second symbol.

12. The integrated circuit of claim 10, further comprising:

a pseudoerror decision gate for comparing symbols of the symbol stream with a time varying decision threshold signal having a plurality of threshold levels and for outputting a logic level in accordance with each comparison;

a pseudoerror counter for comparing the outputs of the main and pseudoerror decision gates and based thereupon, providing an output signal corresponding to a pseudo bit error rate (PBER) for each threshold level of the decision threshold signal; and said threshold optimization circuitry being further operable to generate said decision threshold signal, compare PBERs associated with the respective threshold levels and vary each threshold level so as to satisfy predetermined relationships between the PBERs of the respective threshold levels, and determine the optimized threshold based on threshold level values that satisfy the predetermined relationships.

13. The integrated circuit of claim 12 wherein:

said plurality of levels are formed by first and second time multiplexed square waves, said first square wave defining first and second threshold levels, said second square wave defining third and fourth threshold levels;

said first square wave being varied in amplitude and offset level until the PBERs associated with the first and second levels are substantially equal and the sum thereof substantially equals 0.5, whereby the first and second levels correspond to the means of the first and second symbols, respectively;

said second square wave being varied in amplitude and offset until the PBERs associated with the third and fourth levels are substantially equal and the sum thereof substantially equals 0.32 times the sum of the PBERs of the first and second levels, whereby the third and fourth levels correspond to standard deviation voltages of the first and second symbols, respectively.

14. A receiver comprising:

a data regeneration circuit including:

a main decision gate for regenerating an input symbol stream by comparing the amplitude of individual symbols thereof to a decision threshold and outputting a logic level in accordance with each comparison; and threshold optimization circuitry operable to dynamically measure first and second probability distribution points of each symbol, and based thereupon, to optimize said decision threshold applied to said decision gate.

15. The receiver of claim 14 wherein said input symbol stream is derived from a received optical signal.

16. The receiver of claim 14 wherein said first probability distribution point of each symbol is the mean voltage of the symbol, the second probability distribution point of the first symbol is the mean plus standard deviation voltage of the first symbol, and the second probability point of the second symbol is the mean minus standard deviation voltage of the second symbol.

17. The receiver of claim 14, further comprising:

a pseudoerror decision gate for comparing symbols of the symbol stream with a time varying decision threshold signal having a plurality of threshold levels and for outputting a logic level in accordance with each comparison;

a pseudoerror counter for comparing the outputs of the main and pseudoerror decision gates and based thereupon, providing an output signal corresponding to a pseudo bit error rate (PBER) for each threshold level of the decision threshold signal; and said threshold optimization circuitry being further operable to generate said decision threshold signal, compare PBERs associated with the respective threshold levels and vary each threshold level so as to satisfy predetermined relationships between the PBERs of the respective threshold levels, and determine the optimized threshold based on threshold level values that satisfy the predetermined relationships.

18. A method for setting an optimized decision threshold for application to a main decision gate that performs data regeneration of an input symbol stream based on a comparison of the amplitude of individual symbols thereof to said decision threshold, comprising:

dynamically measuring first and second predetermined probability distribution points of each symbol; and computing and setting said optimized decision threshold based upon said measured distribution points.

19. The method of claim 18 wherein said first probability distribution point of each symbol is the mean voltage of the symbol, the second probability distribution point of a first symbol of the symbol stream is the mean plus standard deviation voltage of the first symbol, and a second probability distribution point of the second symbol of the symbol stream is the mean minus standard deviation voltage of the second symbol.

20. The method of claim 18, wherein said measuring step includes:

comparing symbols of the symbol stream with a time varying decision threshold signal having a plurality of threshold levels and outputting logic levels in accordance with the respective comparisons;

comparing outputs of said decision gate with said logic levels and based thereupon, providing an output signal corresponding to a pseudo bit error rate (PBER) for each threshold level of the decision threshold signal; and comparing PBERs associated with the respective threshold levels and varying each threshold level so as to satisfy predetermined relationships between the PBERs of the respective threshold levels, and determining said first and second probability distribution points based thereupon.

* * * * *